Figure 2:
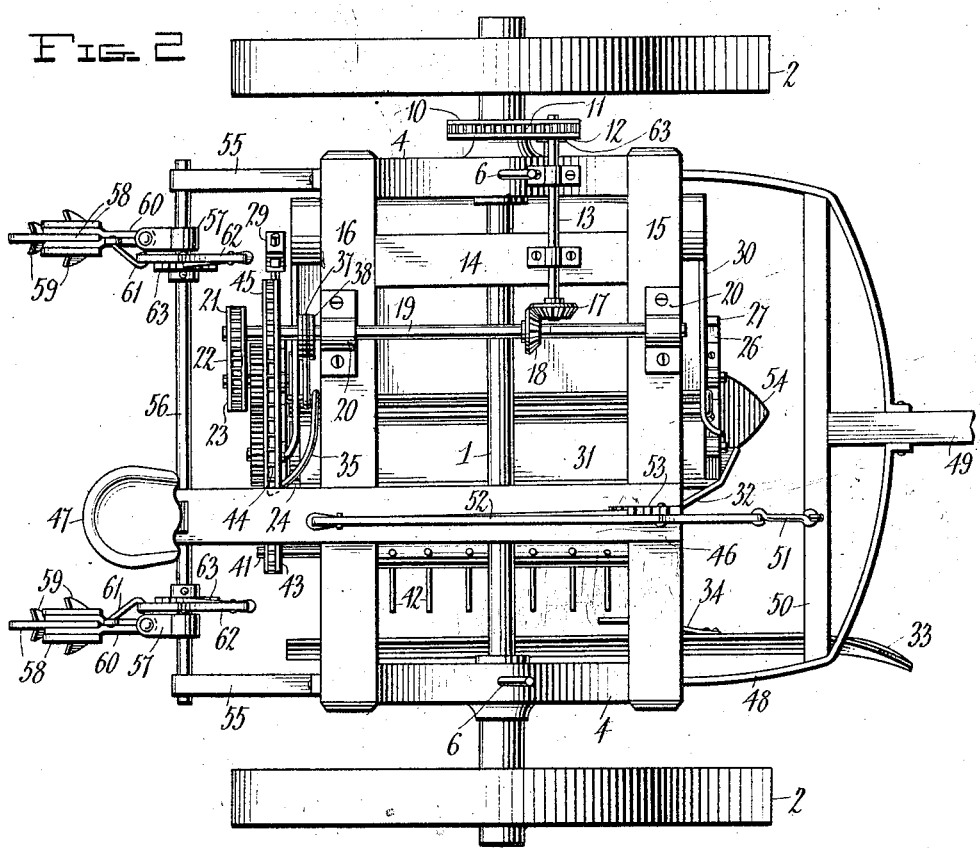

J. PEIL.
COMBINED CULTIVATING AND INSECT DESTROYING MACHINE.
APPLICATION FILED JAN. 16, 1909.
947,455.
Patented Jan. 25, 1910.
5 SHEETS—SHEET 1.
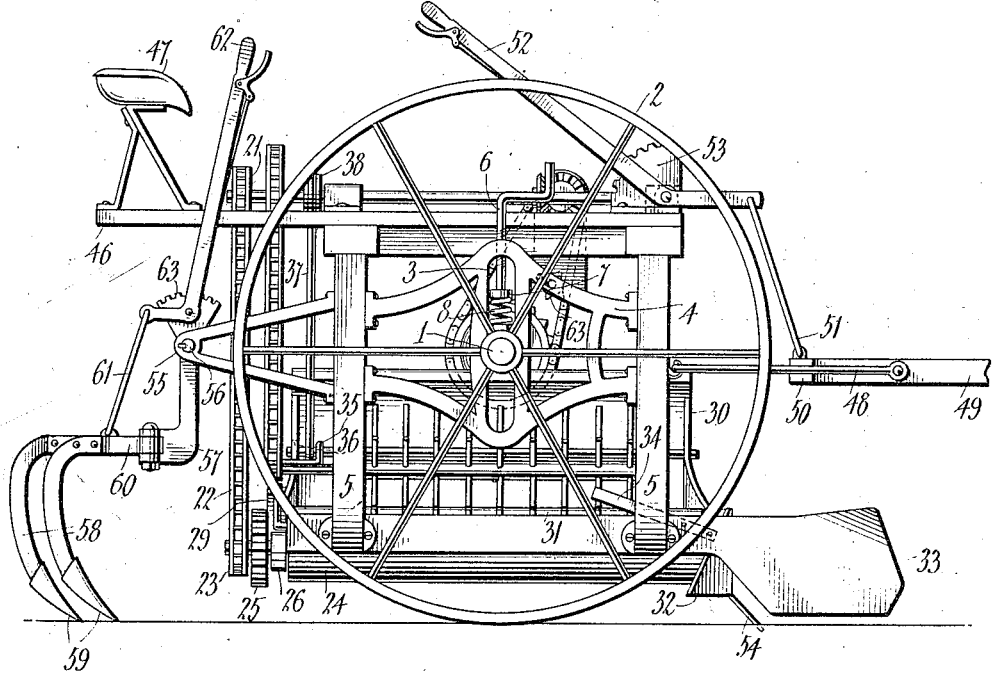
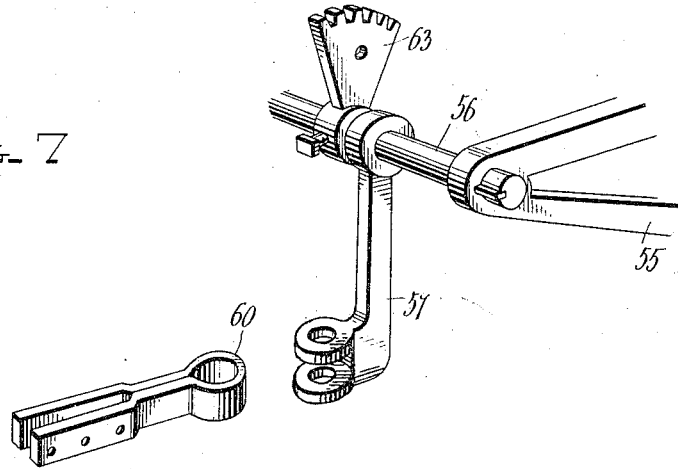
Witnesses
Inventor
Joseph Peil
By
Attorneys J. PEIL.
COMBINED CULTIVATING AND INSECT DESTROYING MACHINE.
APPLICATION FILED JAN. 16, 1909.

947,455.

Patented Jan. 25, 1910.
5 SHEETS—SHEET 2.

Witnesses

Inventor
Joseph Peil
By
Attorneys

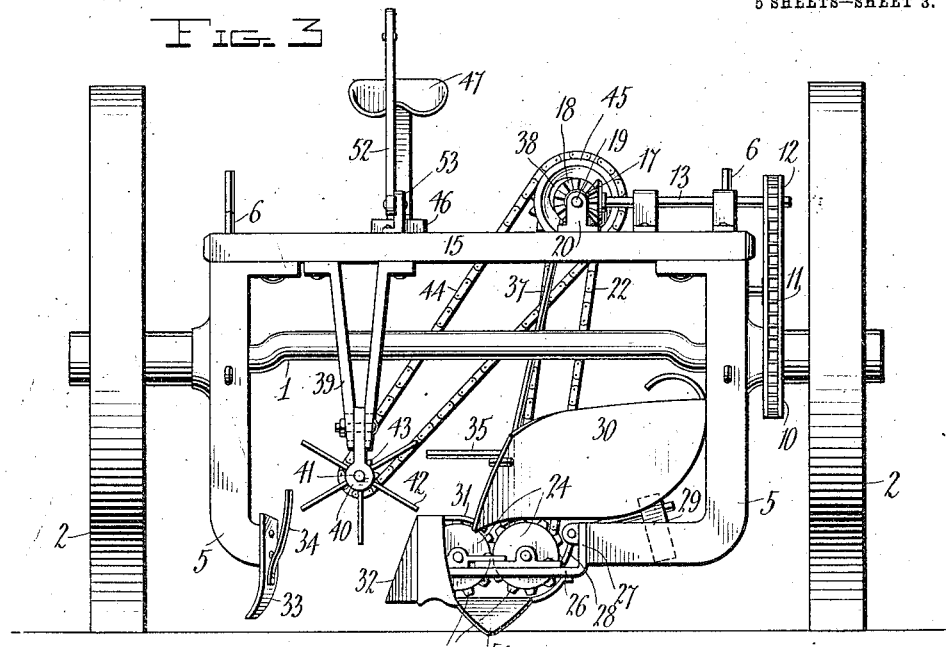
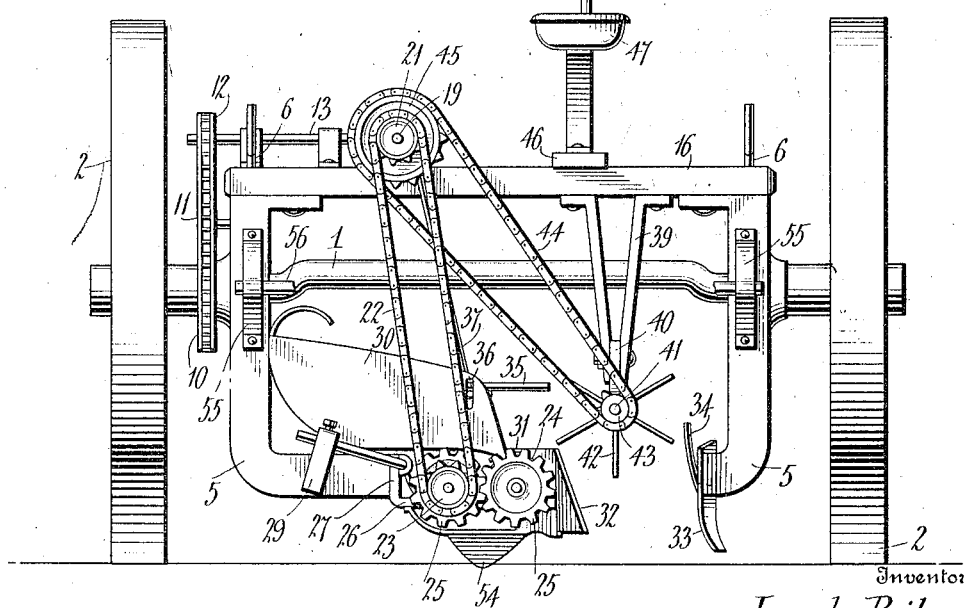

J. PEIL.
COMBINED CULTIVATING AND INSECT DESTROYING MACHINE.
APPLICATION FILED JAN. 16, 1909.

947,455.

Patented Jan. 25, 1910.
5 SHEETS—SHEET 4.

Witnesses

Inventor
Joseph Peil
By
Attorneys

J. PEIL.
COMBINED CULTIVATING AND INSECT DESTROYING MACHINE.
APPLICATION FILED JAN. 16, 1909.
947,455.
Patented Jan. 25, 1910.
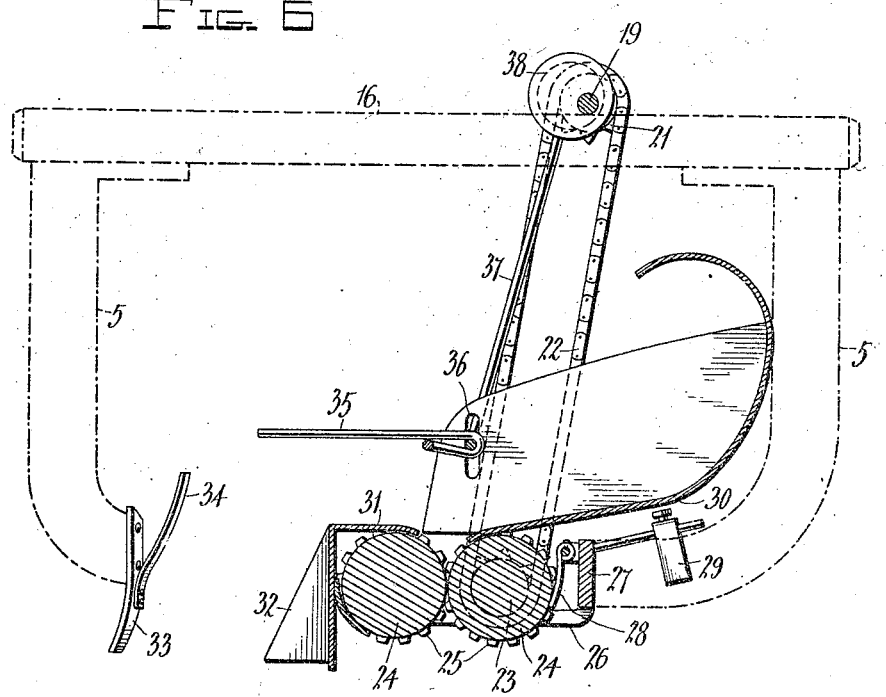
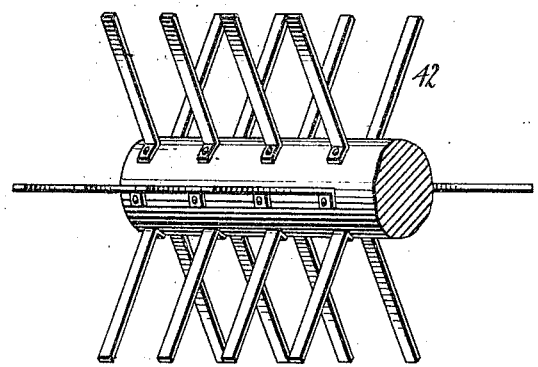

UNITED STATES PATENT OFFICE.

JOSEPH PEIL, OF BLOOMER, WISCONSIN.

COMBINED CULTIVATING AND INSECT-DESTROYING MACHINE.

947,455.  Specification of Letters Patent.  Patented Jan. 25, 1910.

Application filed January 16, 1909. Serial No. 472,685.

*To all whom it may concern:*

Be it known that I, JOSEPH PEIL, a citizen of the United States, residing at Bloomer, in the county of Chippewa, State of Wisconsin, have invented certain new and useful Improvements in Combined Cultivating and Insect-Destroying Machines; and I do hereby declare the following to be a full, clear, and exact description of the invention, such as will enable others skilled in the art to which it appertains to make and use the same.

The invention relates to a combined cultivating and insect destroying machine adapted when being drawn through a field to straddle the plants without injury thereto, to effectively remove the insects from the leaves of the plants and to subsequently destroy the insects and to cultivate the ground adjacent the plants, during the advance movement of the machine, the latter being designed especially for exterminating potato bugs, which infest the leaves of the potato plant, and the construction thereof being an improvement upon Letters Patent No. 877,117, issued January 21, 1908.

The primary object of the invention resides in the provision of a machine of the above mentioned type including means for directing the plants in the path of rotatable beater means such as a brush, means for operating the beater means, means for operating crushing rollers between which the insects fall from the trough into which they are shaken or dislodged by the action of the beater means, and cultivator means subsequently acting upon the ground adjacent the plants at opposite sides thereof.

In the drawings accompanying and forming a part of this specification is illustrated the improved form of embodiment of the invention which to enable those skilled in the art to practice said invention, will be set forth at length in the following description while the novelty of the invention will be included in the claims succeeding the description.

Figure 9:
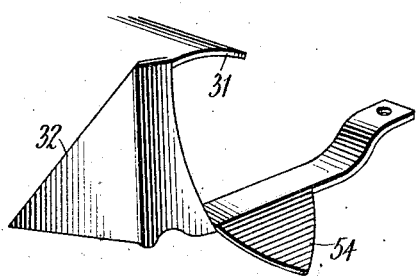
Figure 5:
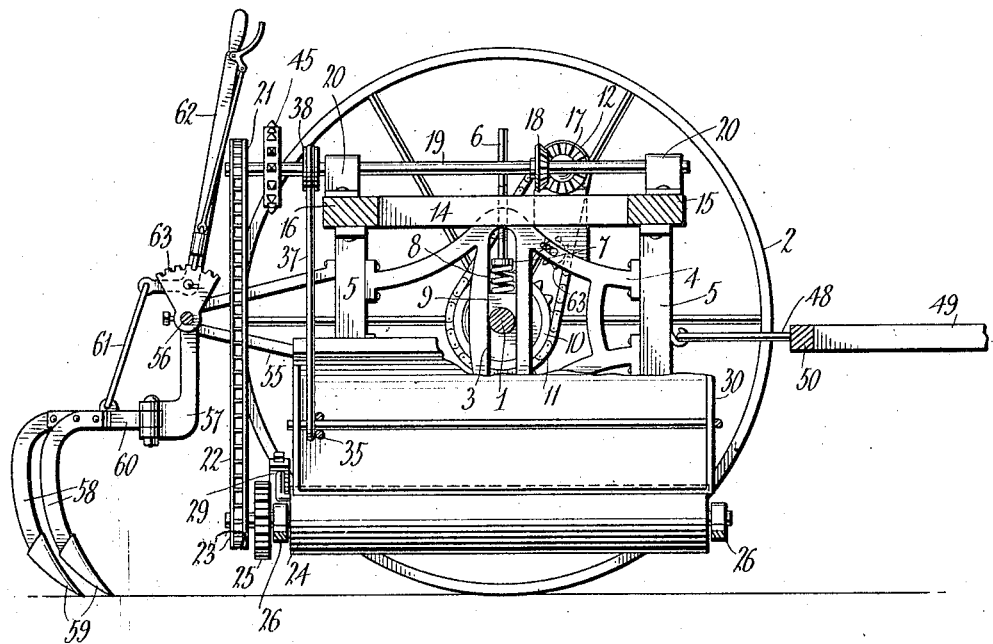
Figure 10:
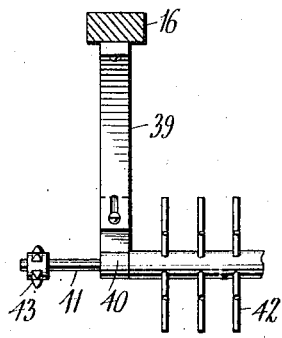

In the drawings:—Figure 1 is a side elevation of the machine. Fig. 2 is a top plan view thereof. Fig. 3 is a front elevation. Fig. 4 is a rear elevation. Fig. 5 is a longitudinal sectional view through Fig. 2. Fig. 6 is a transverse sectional view through Fig. 2. Fig. 7 is a detail view of one of the castings. Fig. 8 is a detail perspective view of the beater brush. Fig. 9 is a detail view of the shoe which carries the guide bar. Fig. 10 is a detail fragmentary view of the adjustable bracket and beater brush.

Similar reference characters indicate corresponding parts throughout the several views in the drawings.

In the drawings:—The numeral 1 designates the axle of the machine which carries at its opposite ends rotatable ground wheels 2 and extends adjacent each end through a vertical slot 3 formed in the casting 4 located at each side of the machine between corresponding front and rear supporting beams 5, to which it is secured. Each casting is provided at its upper end with a threaded opening which communicates with the slot 3, through which opening extends a threaded shaft 6 carrying a collar 7 adjacent its lower end against which collar one end of an expansible coil-spring 8 bears, the opposite end of the latter bearing against the upper face of a block 9 movable vertically in the casting slot and having a curved lower face which rests upon the axle. It will, therefore, be apparent that the frame of the machine may be raised and lowered with respect to the axle, by rotating the shafts 6 in one direction or the other, said shafts having their upper ends bent to form handles. One ground wheel adjacent the left hand casting is provided on its hub with a driving sprocket wheel 10, over which is trained a sprocket chain 11, which latter is also trained over a small sprocket wheel 12, fixed to a shaft 13 mounted in a bearing formed on a longitudinal beam 14 united at its front and rear ends to cross beams 15 and 16, to which the upper ends of the supporting beams 5 are secured. Carried on the inner end of the shaft 13 is a beveled gear 17 meshing with a beveled gear 18 fixed to a longitudinal driven shaft 19 mounted in bearings 20 secured to the cross beams 15 and 16 respectively. The rotation of the ground wheel is thus transmitted to the shaft 19, as will be apparent.

The shaft 19 is provided at its rear end with a sprocket 21 connected by a chain 22 with a sprocket 23 located upon the adjacent end of the shaft of one member of the pair of crushing rollers 24 which are rotated toward each other by means of intermeshing gears 25 with which their shafts are provided, said roller shafts being journaled at opposite ends in bearings mounted upon the laterally projecting arms 26 of a bar 27 which connects the lower end of the right hand supporting beams 5, the bar 27 carrying a U-shaped rocking rod to which a scraper 28 is secured, the scraper being held against the adjacent rolls by means of a weight 29, mounted upon one of the arms of said rod.

Secured to the right hand standard and extending directly over the adjacent crushing rolls is a longitudinal trough 30 whose bottom is set at such an angle as to form a downwardly inclined chute, so that the insects brushed thereonto will be discharged directly into the bite of the rolls to be crushed therebetween, the inner longitudinal edge of the trough being curved so as to more closely approach the adjacent roll, the upper surface of the opposite roll is likewise partly incased throughout its length by a curved longitudinal flange 31, which forms an extension of a metallic shoe 32 terminating at its forward end in an outturned point. Disposed in spaced relation to and parallel with its shoe is a second shoe 33 which is secured to the slightly in-turned lower end of the left hand supporting beams. The shoe last mentioned has secured to its upper face a curved turning rod 34 which is adapted to strike against the plants during their passage between the shoes and to direct them toward the trough side of the machine. The trough is, in addition, provided with a guide 35 which is adapted to strike against the plants and lies directly above the bite of the crushing rolls and is formed by a metallic rod bent substantially into U-shape and pivoted at its forward end to the front end piece of the trough, one of the arms of said guide extending through a vertical slot 36 with which the rear end piece of the trough is provided. The arms of the guide are connected together toward their rear end by bending one arm around the other.

The guide is rocked or oscillated in a vertical plane by means of its engagement of the hooked lower end of the strap 37 of an eccentric 38 which is carried by the shaft 19 adjacent the sprocket 21. This movement of the guide against the lower portion of the plants which are directed thereagainst by the turning rod dislodge the insects from such portion of the plants, whereupon the insects will fall either between the crushing rolls or onto the flange 31.

Depending from the cross beams 15 and 16 are brackets 39, the lower ends of which are slotted and connected with adjustable bearing heads 40, in which is journaled a shaft 41 supporting a brush 42 which is formed either of broom corn or of flat spring steel strips producing a beater disposed throughout a greater portion of the longitudinal extent of the machine. Mounted on the ends of the shaft 41 is a sprocket 43 over which is trained a sprocket chain 44, the latter also trained over a large sprocket 45 fixed to the shaft 19 and through the medium of the latter motion is imparted to the beater brush. The front and rear cross beams 15 and 16 are further connected by a second beam 46 parallel to the beam 14 and upon this beam the seat 47 is mounted. The front supporting beams 5 have pivotally connected thereto the rear ends of the arms of the yoke 48 to which the tongue 49 of the machine is secured, said tongue having cross beam 50 secured to its rear end which is connected by links 51 with the forward end of an angle lever 52 which is pivotally mounted adjacent a segmental rack 53 carried by the beam 46 at its forward end; owing to this construction the entire machine may be tilted in one direction or the other upon its axle, the lever carrying a spring pressed pawl by means of which it is retained in adjusted position.

It is obvious that when the machine is drawn through the field, each row of plants will, in turn, pass between the outwardly turned ends of the shoes 32 and 33 and will be deflected or bent over in the direction of the crushing rolls by the turning rod 34 against which they strike. The plants will then be thoroughly shaken and acted upon by the brush 42 and at the same time will be subject to a further agitation by the guide 35 which vibrates in a vertical plane by reason of its connection with the eccentric strap 38. The thorough agitation to which the deflected plants are subjected under the combined action of the beater and brush will tend to dislodge the insects which infest the plant onto the trough 30 and the flange 31 whence they will fall between the crushing rolls and be destroyed.

Disposed in front of the crushing rolls and suitably mounted in the machine is a depending shoe forming a fender 54 which serves to throw the soil and also remove obstructions in advance of the crusher rolls as said machine travels through a field.

Secured to the rear supporting beams 5 and extending outwardly therefrom are converging hangers 55 forming supports for a horizontal shaft 56 having secured thereto drop castings or rocker arms 57 in which are pivotally supported curved standards 58 carrying at their lower ends cultivator shovels 59 and connected to the pivotal couplings 60 of the standards 58 are rising links 61 the latter having their upper ends connected to throw levers 62 disposed at opposite sides of the beams 46 adjacent the seat 47 and also pivotally mounted adjacent segmental racks 63 so that upon manipulation of the throw levers the cultivator shovels 59 can be raised and lowered relative to the ground and which shovels are adapted to engage the earth at opposite sides of the rows of plants upon the forward travel of the machine to cultivate the soil.

Mounted upon the casting 4 between the sprocket wheel 10 and the sprocket wheel 12 is a spring controlled displaceable idle sprocket 63 which acts upon the chain 11 to maintain the same reasonably taut when the frame of the machine has been vertically adjusted to a raised or lowered position with respect to the ground.

What is claimed is:—

1. In a machine of the class described, in combination, a wheeled frame including front and rear pairs of supporting beams, spaced shoes carried by said supporting beams between which shoes the plants are adapted to pass, a pair of crushing rolls at one side of said shoes, a rotatable brush arranged slightly above and in the space between the shoes, means carried by one of the shoes for deflecting the plants toward the rolls, mechanism actuated by one of the wheels to operate simultaneously the rotatable brush and crushing rolls, a fender disposed in advance of the crushing rolls and cultivating means mounted at the rear of the frame.

2. In a machine of the class described, in combination a wheeled frame, spaced shoes mounted in said frame, between which shoes the plants are adapted to pass, one of said shoes extending at its front end a considerable distance beyond the other shoe to form a gathering extremity, crushing rolls disposed adjacent one of said shoes, means carried by the other shoe for deflecting the plants toward said rolls, a rotary brush coextensive with the longitudinal extent of the rolls and occupying the space between the shoes and adapted to act upon the plants when passed between the latter, separate means actuated by one of the wheels of the frame for operating the brush and roll, and means for tilting the frame.

3. In a machine of the class described, in combination, a wheeled frame including front and rear pairs of supporting beams, a pair of spaced shoes carried by said beams, between which shoes the plants are adapted to pass, a pair of crushing rolls disposed adjacent one of said shoes, brackets depending from opposite ends of the frame and having vertically adjustable bearings, a shaft journaled in said bearings and extending longitudinally the length of the frame, a brush carried by said shaft, means carried by the other shoe for deflecting the plants toward said rolls, a guide disposed above the crushing rolls for agitating the plants, a fender disposed in front of the crushing rolls, means for driving said rolls, and connection between one of the wheels of the frame and said brush carrying shaft to rotate the latter.

4. In a machine of the class described, in combination, a wheeled frame including front and rear pairs of supporting beams, a pair of spaced shoes carried by said beams, between which the plants are adapted to pass, a pair of crushing rolls disposed adjacent one of said shoes, brackets depending from opposite ends of the frame and having vertically adjustable bearings, a shaft journaled in said bearings and extending longitudinally the length of the frame, a brush carried by said shaft, means carried by the other shoe for deflecting the plants toward said rolls, a fender disposed in advance of the crushing rolls, means for driving said rolls, connection between one of the wheels of the frame and said brush carrying shaft to rotate the latter, and adjustable cultivator means arranged at the rear of the frame and adapted to straddle a row of plants.

In testimony whereof, I affix my signature, in presence of two witnesses.

JOSEPH PEIL.

Witnesses:
W. E. KITCH,
A. T. NEWMAN.